CATHODE SPOT TELEVISION RECEIVING SYSTEM

Filed June 2, 1952

INVENTOR.
HENRY W. PARKER

BY Philip S. McLean
ATTORNEY

United States Patent Office 2,840,632
Patented June 24, 1958

2,840,632

CATHODE SPOT TELEVISION RECEIVING SYSTEM

Henry W. Parker, Flushing, N. Y.

Application June 2, 1952, Serial No. 291,194

13 Claims. (Cl. 178—5.4)

The invention herein disclosed relates primarily to television receiving systems, but it is contemplated that various features and possibly the invention as an entirety, may be applied to other uses.

General objects of the invention are to accomplish efficient, distortionless television reception, either plain black and white or colored, with the desired brilliancy and contrast and with the advantages attainable by direct projection on an open screen, enabling enlargement of the picture to desired size and the like.

More specific objects of the invention are to provide a satisfactory light source which will create a spot illumination of great intensity and instantaneous extinguishment and to effect modulation and linear translation of the beam derived from this cathode light spot by simple and as nearly inertialess as possible optical and mechanical means.

Particularly it is a purpose of the invention to provide a video receiver of the character outlined which will be compatible with and operable from television transmitters such as are now in actual service.

Further special objects of the invention are to accomplish all the foregoing with simple, practical apparatus, made up of few parts, automatically held in synchronism and not likely to get out of order.

Other desirable objects attained by the invention and the novel features through which the purposes of the invention are accomplished, are set forth and will appear in the course of the following specification.

The drawing accompanying and forming part of the specification illustrates a present practical embodiment of the invention and various special details. It is appreciated, however, that structure and operation may be modified and changed as regards the immediate illustration, all within the true intent and broad scope of the invention as hereinafter defined and claimed.

Fig. 1 in the drawing is a diagrammatic view illustrating the general principle of operation of the invention as embodied in a color television receiving set;

Figures 1, 2, 3, 4, 5:
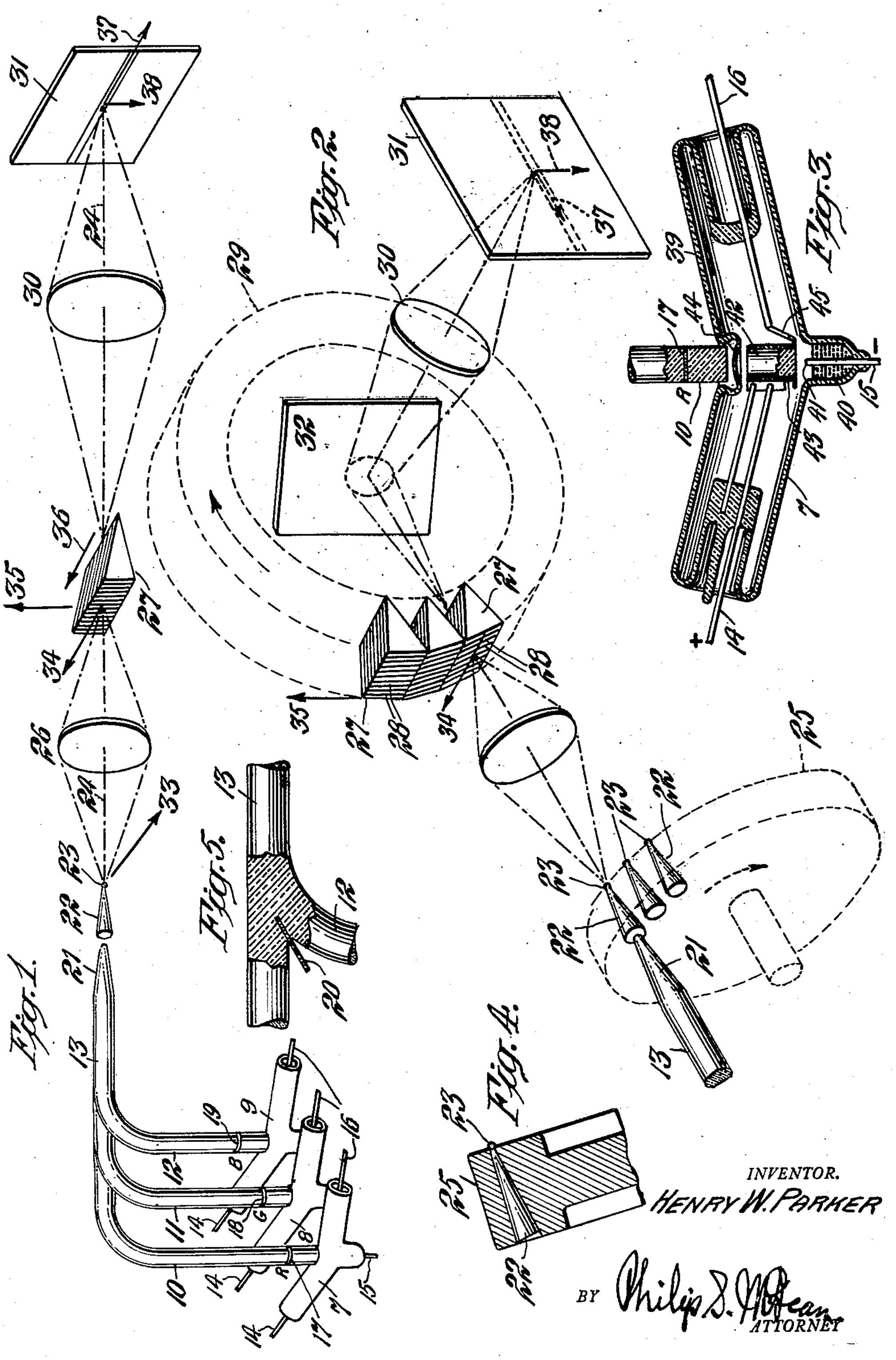
Fig. 2 is a diagrammatic and partly perspective view illustrating a practical embodiment of the invention and showing particularly the mutual perpendicularity of the line sweep and frame sweep wheels.
Fig. 3 is a broken vertical sectional view of one of the cathode spot lamps.
Fig. 4 is an enlarged broken sectional detail showing the manner in which the light concentrating cones are set in the rim of the line sweep wheel at an incline to overcome centrifugal separating force.
Fig. 5 is a broken sectional detail of a portion of the color mixer showing one of the light shields for preventing backward transmission of color.

In Fig. 1 there are shown three cathode spot lamps 7, 8 and 9 of the special design shown in details in Fig. 3, and having individual light guides 10, 11, 12, of clear methyl methacrylate resin such as Lucite or the like, extending to a common conductor 13 of the same or other suitable material.

The cathode spot tubes have suitable conductors 14, 15, 16, by which they may be connected for example, each with a triode driver tube by a high pass impedance matching network, to enable the low resistance cathode spot tube to be driven by a high internal resistance triode power tube.

With this arrangement these low voltage, high current devices can be used to obtain high speed quench of a large amount of cathode spotlight. This low voltage operation is economical and safe.

In the particular arrangement shown, red, green and blue filters 17, 18 and 19 are interposed in the modulated light wave guides 10, 11 and 12, and the last two guides are shielded from each other and from the first guide by shields such as shown at 20, Fig. 5, interposed back of the juncture of the branches 11 and 12 with the main guide 13, to prevent flow of light from an advanced source back through the guides of the other sources.

The main or mixer guide 13 is shown in Fig. 1 terminating in a conically pointed, flat ended projection 21 closely adjacent the opposing, larger flat end of a light concentrating cone 22 having a fine spherical tip 23 in line with the optical axis 24 of the system.

To effect the line sweep there are a number of these light concentrating cones, one hundred and twenty in the present example, set in the rim of a wheel 25, Figs. 2 and 4, rotating in synchronism with the transmission signals, 7,875 R. P. M. in the example.

These cones may be made of fused quartz, polished smooth and platinized on the sides of the cone to concentrate and confine the light.

In the position of registration with the modulated light wave guide 13, they project the concentrated spot through a suitable focusing system, indicated as a single lens 26, onto a prism 27 made up of thin, triangular laminations 28 of clear methyl methacrylate resin such as Lucite or the like, which may be vacuum process silvered on opposite sides to effect light separation.

For frame sweep purposes these laminate prisms are mounted, sixty of them in the example, in a frame sweep wheel 29 rotating in this case at a speed of 60 R. P. M.

The base ends of the prisms are at the rim of the frame sweep wheel 29, with the apexes pointed radially to the axis of rotation.

A suitable projection lens, represented here as a single lens 30, is disposed on the optical axis 24 between the inner ends of the prisms 27 and the screen or surface 31 on which the picture is projected or portrayed.

This screen may be entirely open, as indicated, such as any suitable or special wall surface.

In the practical embodiment of the invention illustrated in Fig. 2, transition of the light spot out of the axis of the frame wheel is effected by a metal faced mirror 32 positioned to bend the optical axis 90°.

The mutual perpendicularity of action is illustrated in Fig. 1, with the arrow 33 indicating movement of the light concentrating cones 22 to the right, producing light spot travel on the prisms to the left, as shown by arrow 34, and upward travel of the prisms, arrow 35, accomplishing, with the left sweep of the spot issuing from the tips of the prisms, arrow 36, a line sweep to the right and downward accumulation of lines on the screen, as represented by arrows 37 and 38.

The cathode spot tubes may be constructed as shown in Fig. 3, with a transparent envelope 39 having a well 40 for the mercury or other cathode material, and an electrode 41 of refractory metal projecting slightly above the surface of the mercury pool, to "anchor" the cathode spot in respect to the clear fused quartz rod 42, supported within the tubular signal anode 43. Erratic movement or "spot wander" of the bright spot is prevented by anchor 41.

To get the intense light from the cathode spot out through the wall of the envelope without distortion or absorption, the envelope may be formed with a thinned, reentrant bubble 44 directly opposite the quartz rod 42.

This reentrant bubble formation may be utilized as a socket for the end of the light guide rod 10.

A "keep alive" electrode is shown provided in the form of a small refractory metal loop 45 near the cathode to minimize the signal electrode "breakdown" voltage for signal electrode current flow.

The signal electrode is placed close to the cathode so that the length of the column of arc plasma is kept to the minimum. This cuts down on plasma light as well as lowering the arc drop, thus providing greater efficiency in cathode spot lumen output per watt input.

In the embodiment of the invention illustrated, the line sweep wheel 25 may be considered as rotating at a speed of 7,875 R. P. M. or 131.25 revolutions per second. This wheel may carry 120 cones, one-quarter inch diameter at their large ends, and set in a circumference of thirty inches, or a circle of 9.56 inches diameter.

Multiplying 131.25 R. P. S. by 120 gives 15,750 lines per second, which is U. S. A standard for black and white or color.

By the used of a 120 salient pole pair rotor energized by a single permanent magnet, a frequency of 15,750 cycles obtained from the picture signal will maintain a synchronous motor operating the line sweep wheel at the desired speed of 7,875 R. P. M. Multiple salient pole motors suitable for the purpose are well-known. Patents 2,436,231 and 2,492,197 illustrate salient pole timing motors such as might be used.

The horizontal synchronizing pulses are converted into a saw-toothed signal wave form in the usual manner and this signal is applied to the control grid of a power pentode tube, in the plate circuit of which is placed the motor. As is well-known in the art, the low impedance of the motor allows peak current to pass on a load line small compared with the variational plate impedance of the pentode tube. The will be recognized as a well-known form of drive used in special radio applications.

The frame sweep is obtained from the slow rotation of the frame wheel 29 carrying the laminated prisms at a speed of 60 R. P. M. or one revolution per second.

Sixty cycles per second obtained from the picture signal, which gives sixty interlaced half picture or thirty full pictures per second, may be used to get the desired frequency from the frame pulse.

A 60 pole pair salient rotor excited by a single permanent magnet will rotate synchronously at 1 R. P. S. for the frame sweep wheel drive.

The frame sweep wheel has sixty laminated prisms mounted on the circumference. The motion of the line sweep effected by each cone is one-quarter inch. With a magnification of 3 in the lens system between the wheels, the illuminated dot or spot will sweep three-quarter inch on the laminated prism face.

This is the width of the picture.

There are 220 laminations stacked at sheet thickness of 0.0034 inch per sheet. For a standard aspect ratio of the picture of 3:4, the picture height is 0.5625 inch which, with the circumference, gives $60 \times 0.5625$ or 33.8 inches, or a diameter of 10.75 inches at the points of the prisms.

The prism height is 0.486 inch, giving outside diameter of the wheel 11.722 inches.

The projection lens is focused at the plane of the tips of the laminated prisms, which are 0.750 inch wide and which sweep 0.5625 inch.

This projection may be comparable in many ways with the projection of home motion pictures from small film onto a large screen.

In further explanation, in this particular example the light point crosses the laminations 28 to the left, as indicated by arrow 34, 262½ times on each successive moving laminated prism on the wheel, and the light emerging from the apex of the prism travels to the left 262½ times on each successive moving laminated prism of the wheel. The apex or inner sharp edge of the prism moves up slowly, one-half frame in one-sixtieth of a second. Thus the light image on the screen will travel to the right and the lines will move down at the slower rate required for the after image effect.

To prevent the cones being loosened or thrown out of the line scanning wheel by reason of the relatively high speed of rotation, these cones may be set at an incline, as shown in Fig. 4, such that centrifugal force will create a locking action tending to secure them the more firmly in the wheel.

The invention provides low cost, low voltage color television receiving apparatus of simple construction but has many other possibilities, for instance, multiplex telephony using a light beam, facsimile simultaneous color transmission, stroboscopes, servomechanisms requiring high speed response in the beta circuit and possibly other instances in which wide band intelligence can be projected over a modulated light beam.

The cathode spot tube provides high intensity, instantaneously extinguishable pinpoint illumination and the light wave guides and color mixer enable transmission and control of such illumination for various purposes.

The cones concentrate and accurately direct the light. For some purposes these light concentrating cones, instead of being on the outside, may be located in the cathode spot tubes, for instance in place of the light directing quartz rods 42.

The projection of the picture onto an open screen permits enlargement or reduction of picture size to suit the audience or to meet other requirements.

The line sweep or line projecting wheel 25 and frame or picture sweep wheel 29 are electrically interlocked so as to maintain the synchronized relation described, which with the values given enables the apparatus to operate with television transmitters of present conventional design.

What is claimed is:

1. Apparatus of the character disclosed comprising a line sweep wheel carrying similarly directed light concentrating cones, a modulated cathode spot tube, means for transmitting the modulated light from said tube to said cones, a frame sweep wheel carrying laminated light prisms in the range of said light concentrating cones, means for effecting the projection of the light images from said prisms onto a viewing screen and means for effecting rotation of said line sweep and frame sweep wheels synchronized to effect line projection and accumulation of lines in picture forming frames on said screen.

2. Apparatus of the character disclosed comprising a plurality of color signal modulated cathode spot light tubes, each having a color filter and provided with colored light directing means terminating in a color mixer, a line sweep wheel carrying light concentrating elements in line with said color mixer, a frame sweep wheel having laminated light prisms, optical focusing means between said light concentrating elements and prisms for directing the concentrated light from said elements onto said prisms, optical projecting means associated with and taking the light from said prisms and means for operating said line sweep and frame sweep wheels in picture producing synchronized relation.

3. Apparatus of the character disclosed comprising a frame sweep wheel having laminated prisms of triangular formation arranged with their bases at the periphery of the wheel and their apexes extending radially of the wheel, a line projecting optical system cooperatively associated with said inner apex ends of the prisms, a line sweep wheel rotating on an axis perpendicular to the axis of the frame sweep wheel and having light concentrating elements registering with the base ends of the prisms, a cathode spot light generator, a light wave guide extending from said cathode spot generator into position for register with said light concentrating elements on the line sweep wheel and means for effecting rotation of said line sweep and frame sweep wheels in synchronized relation.

4. Apparatus of the character disclosed comprising line sweep and frame sweep wheels rotating on perpendicularly related axes, laminated prisms carried by the rim of said frame sweep wheel, light concentrating cones on the line sweep wheel focused on said prisms, a cathode spot tube in light transmitting relation to said light concentrating cones and means for rotating said line sweep and frame sweep wheels in synchronized relation.

5. Apparatus of the character disclosed comprising a rotary carrier, similarly aligned light concentrating cones having flat base ends exposed at one side of said carrier and spherical ends exposed at the opposite side of the carrier, a light wave guide having a reduced end terminating in a flat face opposed to and of smaller size than the flat base ends of the cones and a light source applied to said light wave guide.

6. Apparatus of the character disclosed comprising a rotary carrier, similarly aligned light concentrating cones having flat base ends exposed at one side of said carrier and spherical ends exposed at the opposite side of the carrier, a light wave guide having a reduced end terminating in a flat face opposed to and of smaller size than the flat base ends of the cones and a light source applied to said light wave guide and comprising a cathode spot tube having a light window opposed to the end of said light wave guide.

7. Apparatus of the character disclosed comprising a rotary carrier, similarly aligned light concentrating cones having flat base ends exposed at one side of said carrier and spherical ends exposed at the opposite side of the carrier, a light wave guide having a reduced end terminating in a flat face opposed to and of smaller size than the flat base ends of the cones and a light source applied to said light wave guide, and a second wheel rotating in synchronism with said carrier and having laminated prisms in the focal plane of said light concentrating cones.

8. Apparatus of the character disclosed comprising a line sweep wheel, similarly aligned light concentrating cones fixed in the rim of said wheel and having flat base ends exposed at one side of the wheel and reduced spherical tips exposed at the other side of the wheel and a relatively stationary light wave guide having a flat end opposed to the flat base ends of the cones and of smaller diameter than said flat base ends.

9. In apparatus of the character disclosed, a line sweep wheel rotating at high speed and light concentrating cones set in the rim of said wheel with the smaller ends of the cones inclined radially outwardly at an incline to overcome the effect of centrifugal force developed by the high speed rotation of the wheel.

10. In apparatus of the character disclosed, a plurality of cathode spot light tubes, individual light wave guides extending from said tubes, color filters in said individual guides, a color mixer connected with said guides and light shields interposed at the junction of said individual guides with said color mixer.

11. Apparatus of the character disclosed comprising a cathode spot tube, a light transmitting rod extending from said tube and terminating in a small diameter flat end, light concentrating cones having flat base ends of larger diameter than the end of said rod and mounted for travel past the same, and an optical system associated with said light concentrating cones.

12. Apparatus of the character disclosed comprising a cathode spot tube, a light transmitting rod extending from said tube and terminating in a small diameter flat end, light concentrating cones having flat base ends of larger diameter than the end of said rod and mounted for travel past the same, and an optical system associated with said light concentrating cones and including laminated prisms traveling in synchronized relation past the smaller ends of said cones perpendicular to the travel of said cones.

13. Apparatus of the character disclosed comprising a cathode spot tube, a light transmitting rod extending from said tube and terminating in a small diameter flat end, light concentrating cones having flat base ends of larger diameter than the end of said rod and mounted for travel past the same, an optical system associated with said light concentrating cones and including laminated prisms traveling in synchronized relation past the smaller ends of said cones perpendicular to the travel of said cones, a reflector in line with said prisms and a projection lens in line with said reflector.

References Cited in the file of this patent

UNITED STATES PATENTS

| | | |
|---|---|---|
| Re. 16,789 | Jenkins | Nov. 22, 1927 |
| 1,654,951 | Toulon | Jan. 3, 1928 |
| 2,002,551 | Schmierer | May 28, 1935 |
| 2,036,622 | Emmerich | Apr. 7, 1936 |
| 2,163,548 | Clothier et al. | June 20, 1939 |
| 2,187,908 | McCreary | Jan. 23, 1940 |
| 2,190,308 | Blackburn | Feb. 13, 1940 |
| 2,201,003 | Berkey | May 14, 1940 |
| 2,206,710 | Tonks | July 2, 1940 |
| 2,222,937 | Dimmick | Nov. 26, 1940 |
| 2,453,118 | Buckingham | Nov. 9, 1948 |

OTHER REFERENCES

Radio Movies Receiver, photo, furnished by Jenkins Laboratories, Washington, D. C., to Patent Office July 1927.